(12) United States Patent
Kroczka et al.

(10) Patent No.: US 12,000,976 B2
(45) Date of Patent: Jun. 4, 2024

(54) SYSTEMS AND METHODS FOR TRAINING A WELL MODEL TO PREDICT MATERIAL LOSS FOR A PIPE STRING WITHIN A BOREHOLE

(71) Applicant: Landmark Graphics Corporation, Houston, TX (US)

(72) Inventors: Sebastian Kroczka, Cracow (PL); Welton Danniel Souza, Dan Haag (NL); Chafaa Badis, Lons (FR)

(73) Assignee: Landmark Graphics Corporation, Houston, TX (US)

( * ) Notice: Subject to any disclaimer, the term of this patent is extended or adjusted under 35 U.S.C. 154(b) by 741 days.

(21) Appl. No.: 17/006,110

(22) Filed: Aug. 28, 2020

(65) Prior Publication Data

US 2021/0116599 A1    Apr. 22, 2021

Related U.S. Application Data

(60) Provisional application No. 62/923,729, filed on Oct. 21, 2019.

(51) Int. Cl.
*G01V 20/00*    (2024.01)
*E21B 47/085*   (2012.01)
(Continued)

(52) U.S. Cl.
CPC ............ *G01V 20/00* (2024.01); *E21B 47/085* (2020.05); *G01V 1/40* (2013.01); *G06F 30/27* (2020.01);
(Continued)

(58) Field of Classification Search
CPC ........ G01V 20/00; G01V 99/005; G01V 1/40; G06N 20/00; G06F 30/27; G06F 2113/08;
(Continued)

(56) References Cited

U.S. PATENT DOCUMENTS

| 2015/0372842 A1 | 12/2015 | Wicker, Jr. |
| 2016/0161627 A1 | 6/2016 | Khalaj Amineh |
| 2017/0167241 A1 | 6/2017 | Wu |

FOREIGN PATENT DOCUMENTS

| WO | WO-2009029135 A1 * | 3/2009 | ........... E21B 49/006 |
| WO | 2018156121 A1 | 8/2018 | |

(Continued)

OTHER PUBLICATIONS

Miro, Jaime Valls, et al. "Robotic Pipeline Wall Thickness Evaluation for Dense NDT Inspection." 2018. pp. 1-52. (Year: 2018).*

(Continued)

*Primary Examiner* — John E Johansen
(74) *Attorney, Agent, or Firm* — K&L Gates LLP (57) ABSTRACT

A method for training a well model to predict material loss for a pipe string having a wall thickness and located within a borehole. The method may include measuring the wall thickness of a first pipe string at locations axially along the first pipe string with a logging tool at a first time. The method may also include measuring the wall thickness of the first pipe string at the locations with the logging tool at a second time. The method may further include training a first well model based on a machine learning ("ML") algorithm to predict a predicted amount of material loss in the future for the first pipe string at a selected location using the wall thickness measurements at the first and second times and well operating condition information related to the first pipe string.

20 Claims, 6 Drawing Sheets

(51) Int. Cl.
  *G01V 1/40* (2006.01)
  *G06F 30/27* (2020.01)
  *G06F 113/08* (2020.01)
  *G06F 113/14* (2020.01)
  *G06N 20/00* (2019.01)

(52) U.S. Cl.
  CPC .......... *G06N 20/00* (2019.01); *E21B 2200/20* (2020.05); *G06F 2113/08* (2020.01); *G06F 2113/14* (2020.01)

(58) Field of Classification Search
  CPC . G06F 2113/14; E21B 47/085; E21B 2200/20
  USPC ...................................................... 703/9, 10
  See application file for complete search history.

(56) References Cited

FOREIGN PATENT DOCUMENTS

| WO | WO-2018156121 A1 * | 8/2018 | ............ E21B 47/00 |
| WO | 2019094225 A1 | 5/2019 | |
| WO | WO-2019094225 A1 * | 5/2019 | ............ E21B 47/00 |

OTHER PUBLICATIONS

Cheng, David, and Daniel S. Zeosky. "Pipeline Performance Data Analysis through Machine Learning with Hydraulics Model Assisted Training." PSIG Annual Meeting. PSIG, 2019. (Year: 2019).*
Hu, Xinming, et al. "Prediction of erosion-corrosion in oil and gas-a systematic approach." Nace Corrosion. Nace, 2008. (Year : 2008).*
Kolthof, W. J., and D. Van der Wal. "The Use of Digitised Tubing Caliper Data for Workover Planning." SPE Offshore Europe Conference and Exhibition. SPE, 1991. (Year: 1991).*
Bullard, H. M., R. D. Clarke, and D. H. Rush. "Production logging as applied to post primary production." SPWLA Annual Logging Symposium. SPWLA, 1964. (Year: 1964).*
International Search Report and Written Opinion for related PCT Application No. PCT/US2020/048796 filed Aug. 31, 2020.

* cited by examiner

SYSTEMS AND METHODS FOR TRAINING A WELL MODEL TO PREDICT MATERIAL LOSS FOR A PIPE STRING WITHIN A BOREHOLE

BACKGROUND

This section is intended to provide relevant background information to facilitate a better understanding of the various aspects of the described embodiments. Accordingly, these statements are to be read in this light and not as admissions of prior art.

During oil and gas exploration and production, a network of wells, installations, and other conduits may be established by connecting tubular sections together. For example, a well installation may be completed, in part, by lowering multiple tubular sections (i.e., a casing string) into a borehole, and cementing the casing string in place. In some well installations, multiple casing strings are employed (e.g., a concentric multi-string arrangement) to allow for different operations related to well completion, production, or enhanced oil recovery (EOR) options.

Damage, corrosion, and/or erosion of the tubular sections is an ongoing issue. Efforts to mitigate the loss of material from tubular sections include use of corrosion-resistant alloys, coatings, treatments, and corrosion transfer, among others. Also, efforts to improve monitoring of loss of material are ongoing and, for downhole casing strings, various types of monitoring tools are available. One type of monitoring tool uses electromagnetic (EM) logging tool to collect EM log data that is used to estimate metallic tubular section wall thickness. Other types of downhole logging tools may also be used to detect the current wall thickness of metallic or non-metallic tubular sections.

BRIEF DESCRIPTION OF THE DRAWINGS

Embodiments of the systems and methods for generating a well model to predict material loss for a pipe string within a borehole are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provide systems and methods for training a well model to predict material loss for a pipe string within a borehole. The systems and methods allow for an efficient evaluation of pipe strings and the individual tubular sections of the pipe string to aid in optimizing design of new wells, determining well intervention plans, as well as indicating which tubular sections can be re-used in future well operations. The present disclosure also provides a machine learning ("ML") based model for predicting loss of material from a pipe string or individual tubular sections of the pipe string within a borehole. The model can be used to optimize plans for existing wells and optimize completions of new wells.

Figure 1:
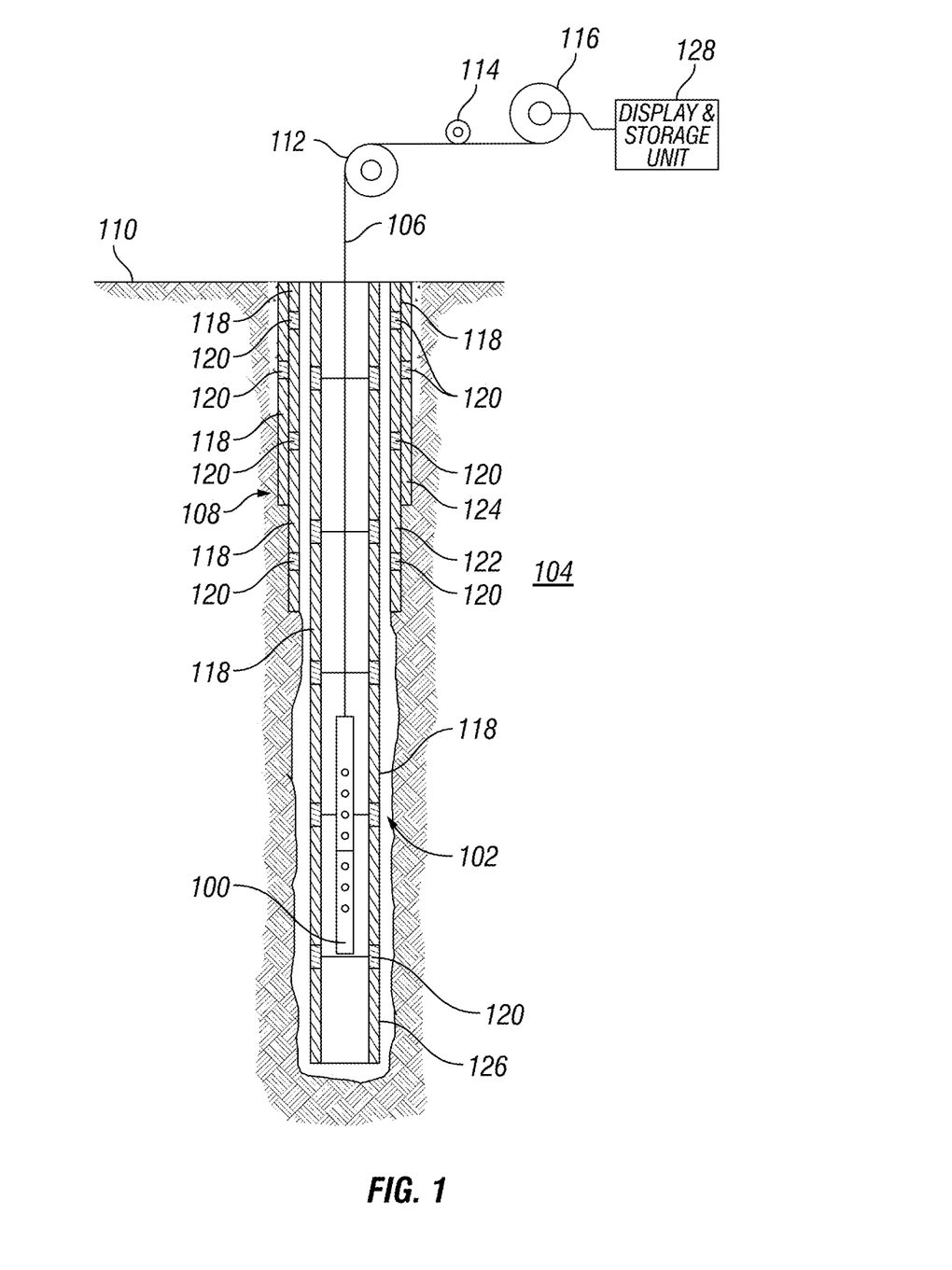
FIG. 1 is a logging tool within a borehole, according to one or more embodiments.

FIG. 1 illustrates a logging tool 100 within a borehole 102 in a subterranean formation 104. The logging tool 100 is operatively coupled to a conveyance 106 (e.g., wireline, slickline, coiled tubing, pipe, downhole tractor, and/or the like) which may provide mechanical suspension, as well as electrical connectivity, for the logging tool 100

It should also be noted that logging tool 100 may be disposed downhole on a bottom hole assembly (BHA) attached to a drill string. For example, the logging tool 100 may be part of a logging while drilling (LWD) or measuring while drilling (MWD) operation. The conveyance 106 and the logging tool 100 may extend within a casing string 108 to a desired depth within the borehole 102. Conveyance 106, which may include one or more electrical conductors, may exit the borehole 102 at the surface 110, pass around pulley 112, engage odometer 114, and be reeled onto winch 116, which is used to raise and lower the tool assembly in the borehole 102.

A casing string 108 may extend from the surface 110 to a selected depth within a borehole 102. The casing string 108 may comprise a plurality of tubular sections 118 of the casing string 108, each tubular section 118 being connected to the adjacent sections by a collar 120. There may be any number of layers in the casing string 108. For example, a first casing 122 and a second casing 124.

A pipe string 126 made up of tubular sections 118 is positioned inside of casing string 108. The pipe string 126 may be production tubing, tubing string, casing string, or other pipe disposed within the casing string 108. The pipe string 126 may comprise concentric pipes. It should be noted that the concentric pipes may be connected by collars 120. The logging tool 100 may be dimensioned so that it may be lowered into the borehole 102 through the pipe string 126, thus avoiding the difficulty and expense associated with pulling the pipe string 126 out of the borehole 102.

In order to evaluate the pipe string 126, the logging tool 100 is operable to transmit electromagnetic fields into the pipe string 126 and even into the subterranean formation 104. The electromagnetic fields from the logging tool 100 may be referred to as a primary electromagnetic field. The primary electromagnetic fields produces Eddy currents in the pipe string 126. These Eddy currents, in turn, produce secondary electromagnetic fields that are sensed, along with the primary electromagnetic fields, by the logging tool 100. The logging tool 100 is operable to measure the primary and secondary electromagnetic fields to determine attributes of the pipe string 126 such as, but are not limited to, pipe wall thickness, pipe conductivity, and/or pipe permeability at multiple axial locations along the pipe string 126. In other embodiments, the logging tool 100 may employ other systems and methods known to those skilled in the art to measure the wall thickness of the pipe string 126 at multiple axial locations. The locations of the measurements may also be assigned to specific tubular sections 118 of the pipe string 126 by either the logging tool 100 or a display and storage unit 128 (discussed below). In one embodiment, the wall thickness of the pipe string 126 is measured at 1 foot intervals along the length of the pipe string 126. In other embodiments, the intervals may be greater than 1 foot or less than 1 foot.

Figure 2:
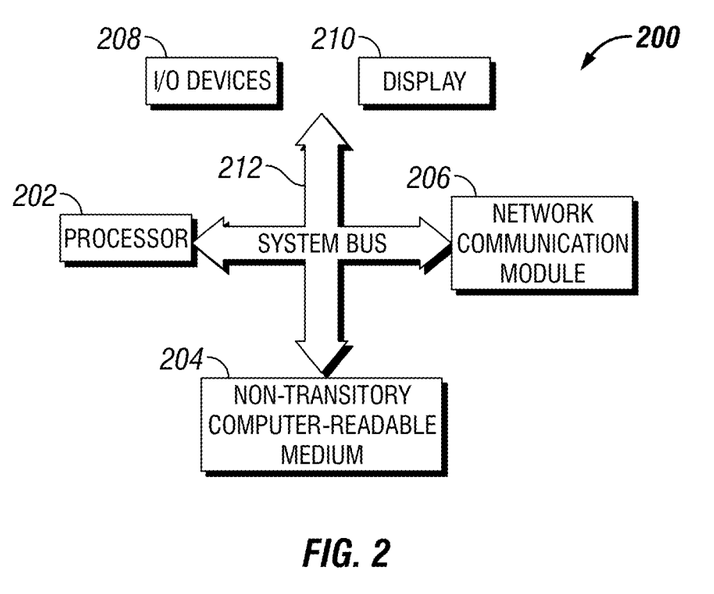
FIG. 2 is a block diagram of a computer system, according to one or more embodiments.

As shown in FIG. 2, the display and storage unit 128 includes a computer system 200 that is in electronic communication with and receives data from the sensor or sensors in the logging tool 100. In at least one embodiment, the logging tool 100 also includes a separate computer system that is similar the computer system 200 of the display and storage unit 128 that receives data from the logging tool 100.

The computer system 200 includes at least one processor 202, a non-transitory computer-readable medium 204, a network communication module 206, optional input/output devices 208, and an optional display 210 all interconnected via a system bus 212. Software instructions executable by the processor 202 for implementing software instructions stored within the computer system 200 in accordance with the illustrative embodiments described herein, are stored in the non-transitory computer-readable medium 204.

Although not explicitly shown in FIG. 2, it will be recognized that the computer system 200 may be connected to one or more public and/or private networks via appropriate network connections. It will also be recognized that software instructions may also be loaded into the non-transitory computer-readable medium 204 from a CD-ROM or other appropriate storage media via wired or wireless means.

The current wall thickness measurements of the pipe string 126 are then compared to the initial wall thicknesses of the pipe string 126 at the respective locations by the display and storage unit 128 to determine an amount of material loss for the pipe string 126. The material loss is the material removed from the pipe string due to damage, corrosion, and/or erosion over time at each location and/or tubular section 118.

After determining the amount of material loss for each location along the pipe string 126, the display and storage unit 128 outputs a visual representation of the amount of loss of material from the pipe string 126.

Figure 3:
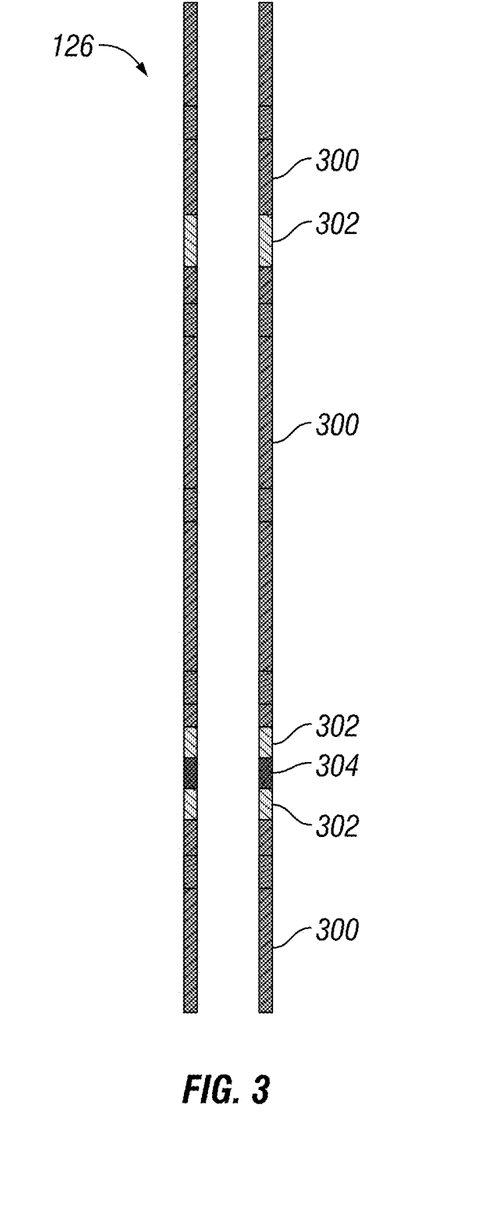
FIG. 3 is an illustration of a graphical user interface (GUI) showing a representation of the amount of loss of material from a pipe string within a borehole, according to at least one embodiment.

The data and storage unit 128 then categorizes the pipe string 126 at the multiple axial locations into three color-coded integrity categories and then generates a graphic or visual representation on the display 210 showing the integrity of the pipe string 126 using the color codes, as shown in FIG. 3. In the exemplary embodiment, the green areas 300 of FIG. 3 indicate locations along the pipe string 126 that are relatively undamaged (i.e., less than 5% loss of material) and do not need to be reworked or replaced. The yellow areas 302 of FIG. 3 indicate locations along the pipe string 126 that have minor damage, corrosion, and/or erosion (i.e., between 5% and 10% loss of material), but do not currently need to be reworked or replaced. The red area 304 of FIG. 3 indicates a location along of the pipe string 126 that has been damaged, corroded, or eroded to such a point that rework, replacement, or shutdown is necessary (i.e., greater than a 10% loss of material). Alternatively, the tubular sections 118 of the pipe string may be divided into the color-coded categories based on the lowest integrity of the locations associated with each tubular section 118. In such embodiments, the graphic may display the color-coded tubular sections 118 instead of color-coded locations along the pipe string 126.

The percentages of material loss associated with each category above are given as examples and other percentages of material loss may be used for each category. The criteria for determining the percentages of material loss associated with each category vary for each well and is based on many factors including, but not limited to, the current and initial wall thicknesses of the pipe string 126 at the respective location, the diameter of the pipe string 126, the composition of the pipe string 126, an expected internal pressure of the pipe string 126, a pressure within the borehole 102, properties of fluids used in the borehole and/or pipe string 126, operations conducted within the borehole 102, and/or the geology of the subterranean formation 104. Several of these factors may be determined by the logging tool 100 or other sensors used within the borehole 102. Other factors may be obtained by referencing a look-up table stored on the display and storage unit 128. The display and storage unit 128 may be used to evaluate the relevant factors for the pipe string 126 to determine the percentages of material loss to be used for each category. In another embodiment, a user can set the percentages of material loss to be used for each category.

Figure 4:
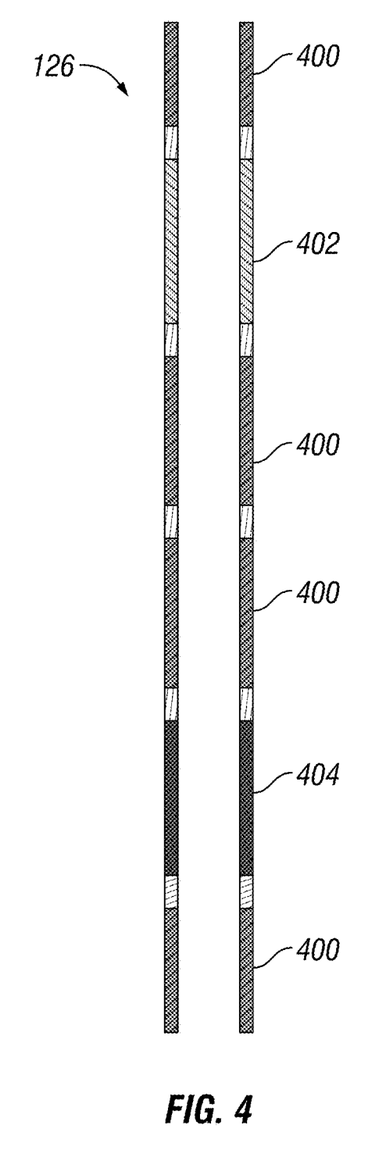
FIG. 4 is an illustration of a graphical user interface (GUI) showing a representation of the amount of loss of material from individual sections of a pipe string within a borehole, according to at least one embodiment.

The graphic shown in FIG. 4 is an alternative analysis that may be generated by the display and storage unit 128. The color coding system used in FIG. 4 is similar to the color coding system described with reference to FIG. 3. However, instead of showing locations along the pipe string 126 that require rework or replacement, the colors indicate tubular sections 118 of the pipe string 126 that can be reused in a rework process or other borehole operations within the current well or a different well. The categorization of each tubular section 118 is based on the largest amount of material loss for the pipe string at the locations associated with the respective tubular section 118. In cases where the tubular sections 118 are intended to be used in a different well, the look-up table stored on the display and storage unit 128 also includes information about the well in which the tubular sections 118 might be used. The green sections 400 of FIG. 4 indicate tubular sections 118 that relatively undamaged (i.e., less than 5% loss of material) and can be reused. The yellow sections 402 of FIG. 4 indicate tubular sections 118 that that have minor damage, corrosion, and/or erosion (i.e., between 5% and 10% loss of material), but that can potentially be reused in some applications. The red sections 404 of FIG. 4 indicate tubular sections 118 that have been damaged, corroded, or eroded to such a point that rework or replacement is necessary (i.e., greater than a 10% loss of material).

As with the categorization of the pipe string 126 described above, the percentages of material loss associated with each category above are given as examples and other percentages of material loss may be used for each category. The criteria for determining the percentages of material loss associated with each category vary for each well and is based on many factors including, but not limited to, the current and initial wall thicknesses of the tubular sections 118 the location associated with the tubular section 118 having the largest amount of material loss, the diameter of the pipe string 126, the composition of the pipe string 126, an expected internal pressure of the pipe string 126, a pressure within the borehole 102, properties of fluids used in the borehole and/or pipe string 126, operations conducted within the borehole 102, the geology of the subterranean formation 104, potential future borehole operations, and/or the conditions of another well. Several of these factors may be measured by the logging tool 100 or other sensors used within the borehole 102. Other factors may be obtained by referencing a look-up table stored on the display and storage unit 128. The display and storage unit 128 may be used to evaluate the relevant factors for the pipe string 126 to determine the percentages of material loss for each category. In another embodiment, the user can set the percentages of material loss for each category.

The graphics generated by the display and storage unit 128 and shown in FIGS. 3 and 4 provide visual references that can be reviewed by an operator and problem areas can be quickly identified, instead of the operator having to review a spreadsheet containing the measurements from the logging tool 100 and comparing those to initial wall thickness values. Accordingly, the graphics shown in FIGS. 3 and 4 reduce the time involved in planning rework and/or replacement of the pipe string 126 of a producing well and ultimately reduce downtime of the producing well.

Although the exemplary embodiments shown in FIGS. 3 and 4 use three categories, green, yellow, and red, to indicate specific levels of damage, corrosion, and/or erosion, the invention is not thereby limited. In other embodiments, additional or fewer integrity categories may be used and different colors or types of indicators may be used to differentiate the integrity categories of the pipe string 126 or tubular sections 118.

Figure 5:
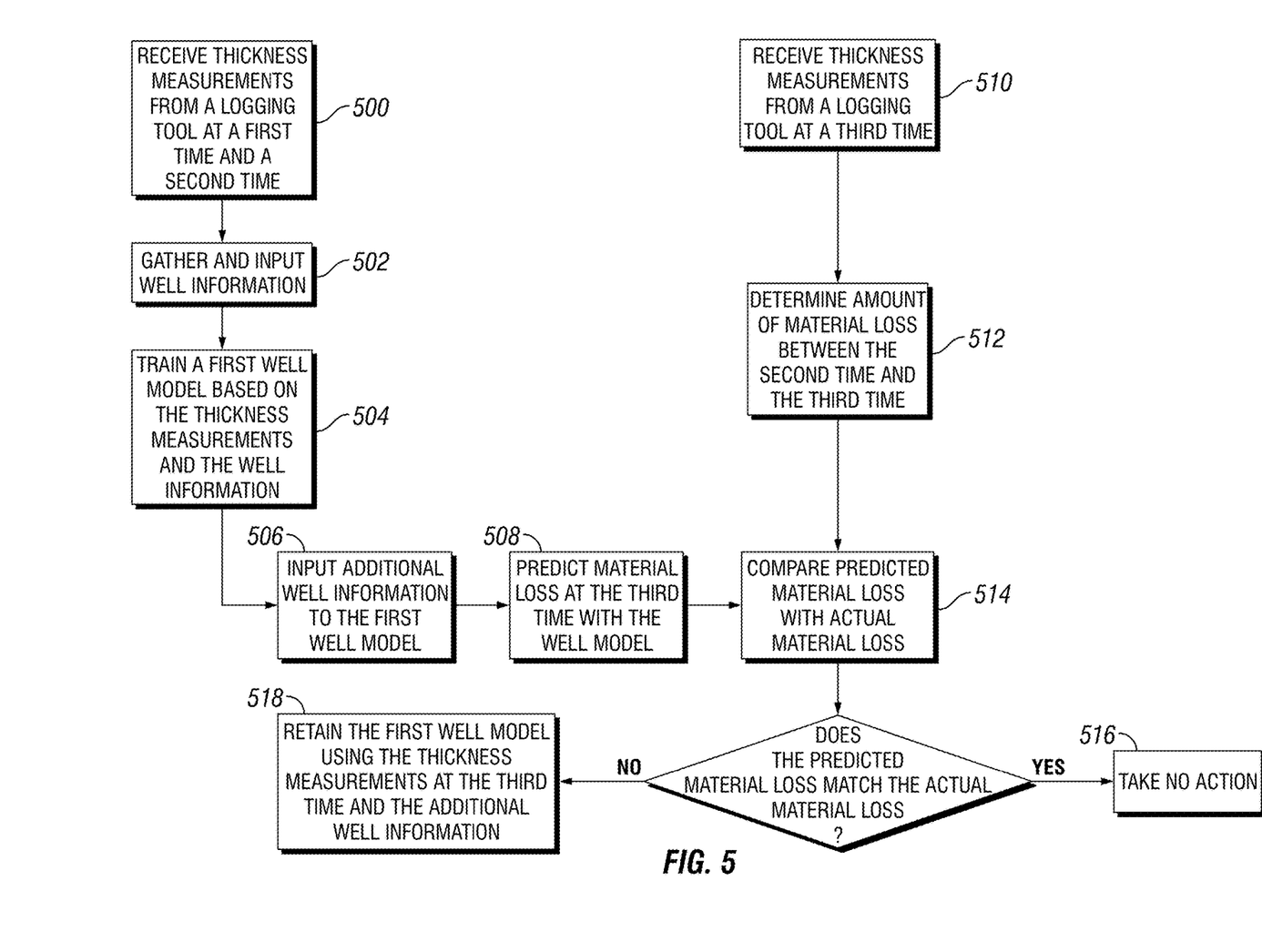
FIG. 5 is a flowchart of a method for generating a well model to predict material loss for a pipe string within a borehole.

FIG. 5 is a flowchart of a method for generating a well model to predict material loss for a pipe string within a borehole. The method may be performed by the display and storage unit 128 or another computer system similar to the computer system 200 shown in FIG. 2, in addition to creating the graphics described above with reference to FIGS. 3 and 4.

In step 500, the wall thickness measurements taken by the logging tool 100 at a first time and a second time are received by the display and storage unit 128 or another computer. Well operating condition information is historical information about the well and information about the surrounding formation such as, but not limited to, the amount of time in operation, the fluids used in the borehole 102, the operations conducted within the borehole 102, the geology of the subterranean formation 104, the materials used in the pipe string 126, and the initial wall thickness of the pipe string 126. The well operating condition information is also input into the display and storage unit 128, as shown in step 502. The wall thickness measurements and well operating condition information is used to train a first well model, as shown in step 504. The first well model can be used to a predicted amount of material loss at a selected location along the pipe string 126 within the borehole 102 over time. The selected location may be one of the locations that was measured by the logging tool or may be a location that was not measured by the logging tool 100.

Additional well operating condition information such as, but not limited to the amount of time in operation, the fluids used in the borehole 102 and the operations conducted within the borehole 102 generated between the second time and the third time is input into the first well model, as shown in step 506. The first well model is then used to predict the amount of material loss between the second time and the third time, as shown in step 508. Once the amount of material loss is predicted, the logging tool 100 can make an additional pass through the pipe string 126 to verify or retrain the well model. Wall thickness measurements of the pipe string 126 are taken by the logging tool 100 at a third time that is after the first and second times and the wall thickness measurements are received by the display and storage unit 128, as shown in step 510. The wall thickness measurements at the third time are then used to determine the amount of material loss between the second time and the third time, as shown at step 512.

The actual amount of material loss at the third time is compared to the first well model's predicted amount of material loss at the third time, as shown in step 514, to determine the accuracy of the first well model. If the first well model's prediction matches the actual amount of material loss, no action is taken, as shown in Step 516. If the actual amount of material loss differs from the first well model's predicted amount of material loss, the wall thickness measurements at the third time and the additional well operating condition information are used to re-train the well model, as shown in step 518, resulting in a retrained well model. This process can occur multiple times over the life of the well to generate a progressively more accurate well models.

The well model can be used to determine when to plug and abandon an existing well by predicting the time needed to reach maximum allowable loss (MAL) point for the pipe string 126 within the borehole 102. After reaching MAL, further utilization of the tubular sections 118 of the pipe string 126 should be stopped due to safety constrains (for example exposure to a leak). MAL is determined individually for each pipe string 126 within a borehole 102 based on the fluids used in the borehole 102, the operations conducted within the borehole 102, the geology of the subterranean formation 104, the materials used in the pipe string 126, and the initial wall thickness of the pipe string 126, as well as other factors. However, MAL can also be predicted for pipe strings 126 within a field, or a group of wells, using the well model, as described in more detail below.

Figure 6:
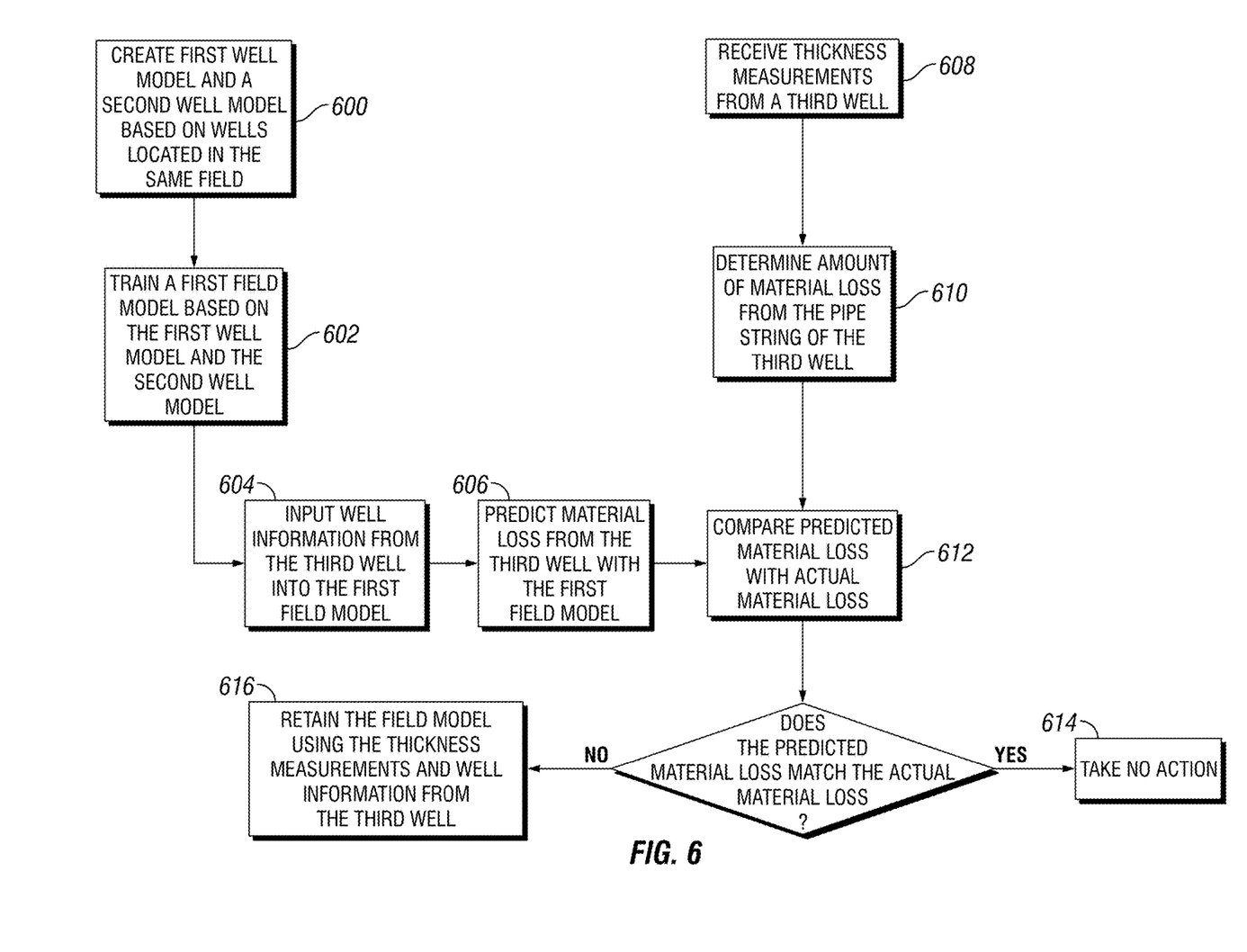
FIG. 6 is a flowchart of a method for generating a field model to predict material loss for a pipe string within a borehole.

A large-scale field model can also be developed based on models of individual wells generated as described above. At least two well models generated using information from two different wells located in the same field are used to train a first field model to identify how the various conditions and materials affect wells located in the field over time, as shown in step 600 and step 602.

The well operating condition information for a third well such as, but not limited to, the amount of time in operation, the fluids used in the borehole 102, the operations conducted within the borehole 102, the geology of the subterranean formation 104, the materials used in the pipe string 126, and the initial wall thickness of the pipe string 126 is input into the first field model, as shown in step 604. The first field model is then used to predict the amount of material loss for the third well, as shown in step 606. Similar to the process described above, the first field model can be verified or retrained on data from the third well in the same field. A logging tool 100 can make a pass through the pipe string 126 of the third well and take wall thickness measurements of the pipe string 126 in the third well. The wall thickness measurements are received by the display and storage unit 128, as shown in step 608. The wall thickness from the third well are used to determine the amount of material loss for the pipe string of the third well, as shown in step 610.

The actual amount of material loss of the pipe string 126 at the third time is compared to the first field model's predicted amount the amount of material loss of the pipe string, as shown in step 612. If the first field model's prediction matches the actual amount of material loss, no action is taken, as shown in step 614. If the actual amount of material loss differs from the first field model's predicted amount of material loss, the wall thickness measurements and well operating condition information from the third well are used to re-train the field model, as shown in step 616, resulting in a second field model. This process can occur multiple times over the life of the field to generate a progressively more accurate field models.

The field model can be used to predict future rework and/or abandonment needs of existing wells, allowing an operator to source the necessary material in advance, thereby reducing downtime of existing wells. The field model can also be used to design pipe strings for new wells to be drilled in the same field that mitigates the amount of rework that will be necessary in the future.

Similar to generating a field model, multiple well models can be used to generate an asset model. The method for generating the asset model is the same as generating the field model described above. However, the well models can be from any well in any field, not just wells located in the same field. The asset model can also be verified or retrained as discussed above with reference to the field model. Alternatively, multiple field models can be used to generate the asset model using the method described above for the generation of a field model. The asset model allows an operator to identify similarities between wells at different fields and predict future rework and/or abandonment needs of a well based on what has occurred at other wells. Additionally, an improved completion plan for the first wells in a new field can be generated based on wells in similar geological conditions.

Further examples include:

Example 1 is a method for training a well model to predict material loss for a pipe string having a wall thickness and located within a borehole. The method includes measuring the wall thickness of a first pipe string at locations axially along the first pipe string with a logging tool at a first time. The method also includes measuring the wall thickness of the first pipe string at the locations with the logging tool at a second time. The method further includes training a first well model based on an ML algorithm to predict a predicted amount of material loss in the future for the first pipe string at a selected location using the wall thickness measurements at the first and second times and well operating condition information related to the first pipe string.

In Example 2, the embodiments of any preceding paragraph or combination thereof further include determining when to plug and abandon the borehole based on the first well model.

In Example 3, the embodiments of any preceding paragraph or combination thereof further include determining an amount of actual material loss for the first pipe string at the locations based on the wall thickness measurements at the first time. The method also includes categorizing the locations into color-coded categories based on the amount of actual material loss for the pipe string at the respective locations. The method further includes generating a visual representation of the amount of actual material loss for the first pipe string using the color-coded categories on a display.

In Example 4, the embodiments of any preceding paragraph or combination thereof further include associating each of the locations with a tubular section of the first pipe string. The method also includes categorizing each tubular section into a color-coded category based on the color-coded category of the location with largest amount of material loss for each tubular section. Generating the visual representation of the loss of material from the first pipe string comprises generating a visual representation of the largest amount of material lost from each tubular section using the color-coded categories.

In Example 5, the embodiments of any preceding paragraph or combination thereof further include measuring wall thicknesses of the first pipe string at the locations with the logging tool at a third time. The method also includes predicting a predicted amount of material loss at the locations at the third time with the first well model. The method further includes determining an amount of actual material loss for the first pipe string at the locations at the third time. The method also includes comparing the actual amount of actual material loss at the third time to the predicted amount of material loss at the third time to determine if the first well model is accurate.

In Example 6, the embodiments of any preceding paragraph or combination thereof further include retraining the first well model using the wall thickness measurements at the third time and additional well operating condition information generated between the second time and the third time.

In Example 7, the embodiments of any preceding paragraph or combination thereof further include training a second well model based on thickness measurements from and well operating condition information related to a second pipe string located in a second borehole. The method also includes training a pipe string model using the first well model and the second well model. The method further includes designing a pipe string for use in a third borehole based on the pipe string model.

Example 8 is a system for training a well model to predict material loss for a pipe string having a wall thickness and located within a borehole. The system includes a logging tool operable to measure a wall thickness of a first pipe string at locations axially along the first pipe string and a processor in electronic communication with the logging tool. The processor is programmed to receive, from the logging tool, wall thickness measurements of a first pipe string at locations axially along the first pipe string at a first time. The processor is also programmed to receive, from the logging tool, wall thickness measurements of the first pipe string at the locations at a second time. The processor is further programmed to train a first well model based on an ML algorithm to predict a predicted amount of material loss in the future for the first pipe string at a selected location using the wall thickness measurements at the first and second times and well operating condition information related to the first pipe string.

In Example 9, the embodiments of any preceding paragraph or combination thereof further include a display in electronic communication with the processor. The processor is further programmed to determine an amount of actual material loss for the first pipe string at the locations based on the wall thickness measurements at the first time. The processor is also programmed to categorize the locations into color-coded categories based on the amount of actual material loss for the pipe string at the respective locations. The processor is further programmed to generate a visual representation of the amount of actual material loss for the first pipe string using the color-coded categories on the display.

In Example 10, the embodiments of any preceding paragraph or combination thereof further include wherein the processor is further programmed to associate each of the locations with a tubular section of the first pipe string. The processor is also programmed to categorize each tubular section into a color-coded category based on the color-coded category of the location with largest amount of material loss for each tubular section. Generating the visual representation of the loss of material from the first pipe string comprises generating a visual representation of the largest amount of material lost from each tubular section using the color-coded categories.

In Example 11, the embodiments of any preceding paragraph or combination thereof further include wherein the processor is also programmed to receive, from the logging tool, wall thickness measurements of the first pipe string at locations along the first pipe string at a third time. The processor is further programmed to predict a predicted amount of material loss at the locations at the third time with the first well model. The processor is also programmed to determine an amount of actual material loss for the first pipe string at the locations at the third time. The processor is further programmed to compare the actual amount of actual material loss at the third time to the predicted amount of material loss at the third time to determine if the first well model is accurate.

In Example 12, the embodiments of any preceding paragraph or combination thereof further include wherein the processor is further programmed to retrain the first well model using the wall thickness measurements at the third time and additional well operating condition information generated between the second time and the third time.

In Example 13, the embodiments of any preceding paragraph or combination thereof further include wherein the processor is further programmed to train a second well model based on thickness measurements from and well operating condition information related to a second pipe string located in a second borehole. The processor is also programmed to train a pipe string model using the first well model and the second well model.

Example 14 is a non-transitory computer-readable medium comprising instructions which, when executed by a processor, enables the processor to perform a method for training a well model to predict material loss for a pipe string having a wall thickness and located within a borehole. The method includes receiving wall thickness measurements of a first pipe string at locations axially along the first pipe string at a first time. The method also includes receiving wall thickness measurements of the first pipe string at the locations at a second time. The method further includes training a first well model based on an ML algorithm to predict a predicted amount of material loss in the future for the first pipe string at a selected location using the wall thickness measurements at the first and second times and well operating condition information related to the first pipe string.

In example 15, the embodiments of any preceding paragraph or combination thereof further include wherein the method further comprises determining when to plug and abandon the borehole based on the first well model.

In Example 16, the embodiments of any preceding paragraph or combination thereof further include wherein the method further includes determining an amount of actual material loss for the first pipe string at the locations based on the wall thickness measurements at the first time. The method also includes categorizing the locations into color-coded categories based on the amount of actual material loss for the pipe string at the respective locations. The method further includes generating a visual representation of the amount of actual material loss for the first pipe string using the color-coded categories on a display.

In Example 17, the embodiments of any preceding paragraph or combination thereof further include wherein the method further includes associating each of the locations with a tubular section of the first pipe string. The method also includes categorizing each tubular section into a color-coded category based on the color-coded category of the location with largest amount of material loss for each tubular section. Generating the visual representation of the loss of material from the first pipe string comprises generating a visual representation of the largest amount of material lost from each tubular section using the color-coded categories.

In Example 18, the embodiments of any preceding paragraph or combination thereof further include wherein the method further includes receiving wall thickness measurements of the first pipe string at the locations at a third time. The method also includes predicting a predicted amount of material loss at the locations at the third time with the first well model. The method further includes determining an amount of actual material loss for the first pipe string at the locations at the third time. The method also includes comparing the actual amount of actual material loss at the third time to the predicted amount of material loss at the third time to determine if the first well model is accurate.

In Example 19, the embodiments of any preceding paragraph or combination thereof further include wherein the method further comprises retraining the first well model using the wall thickness measurements at the third time and additional well operating condition information generated between the second time and the third time.

In Example 20, the embodiments of any preceding paragraph or combination thereof further include wherein the method further includes training a second well model based on thickness measurements from and well operating condition information related to a second pipe string located in a second borehole. The method also includes training a pipe string model using the first well model and the second well model. The method further includes designing a pipe string for use in a third borehole based on the pipe string model.

For the embodiments and examples above, a non-transitory computer-readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

Certain terms are used throughout the description and claims to refer to particular features or components. As one skilled in the art will appreciate, different persons may refer to the same feature or component by different names. This document does not intend to distinguish between components or features that differ in name but not function.

In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for training a well model to predict material loss for a pipe string having a wall thickness and located within a borehole, the method comprising:
    measuring the wall thickness of a first pipe string at locations axially along the first pipe string with a logging tool at a first time;
    measuring the wall thickness of the first pipe string at the locations with the logging tool at a second time;
    training a first well model based on a machine learning ("ML") algorithm to predict a predicted amount of material loss in the future for the first pipe string at a selected location using the wall thickness measurements at the first and second times and well operating condition information related to the first pipe string;
    determining an amount of actual material loss for the first pipe string at the locations based on the wall thickness measurements;
    receiving input from a user relating to user-defined color-coded categories based on the amount of actual material loss for the pipe string;
    categorizing the locations into the user-defined color-coded categories at the respective locations; and
    generating a graphical user interface showing a visual representation of the amount of actual material loss for the first pipe string using the user-defined color-coded categories on a display.

2. The method of claim 1, further comprising determining when to plug and abandon the borehole based on the first well model.

3. The method of claim 1, further comprising:
    associating each of the locations with a tubular section of the first pipe string; and
    categorizing each tubular section into one of the user-defined color-coded categories based on the user-defined color-coded category of the location with largest amount of material loss for each tubular section,
    wherein generating the graphical user interface showing the visual representation of the loss of material from the first pipe string comprises generating the graphical user interface showing the visual representation of the largest amount of material lost from each tubular section using the user-defined color-coded categories.

4. The method of claim 1, further comprising:
    measuring wall thicknesses of the first pipe string at the locations with the logging tool at a third time;
    predicting a predicted amount of material loss at the locations at the third time with the first well model;
    determining an amount of actual material loss for the first pipe string at the locations at the third time; and
    comparing the actual amount of actual material loss at the third time to the predicted amount of material loss at the third time to determine if the first well model is accurate.

5. The method of claim 4, further comprising retraining the first well model using the wall thickness measurements at the third time and additional well operating condition information generated between the second time and the third time.

6. The method of claim 1, further comprising:
    training a second well model based on thickness measurements from and well operating condition information related to a second pipe string located in a second borehole in a same field as the first borehole; and
    training a field model using the first well model and the second well model to predict how well operating conditions affect pipe strings located in boreholes in the field.

7. The method of claim 6, further comprising training the field model to predict at least one of rework or abandonment of any borehole in the field.

8. A system for training a well model to predict material loss for a pipe string having a wall thickness and located within a borehole, the system comprising:
    a logging tool operable to measure a wall thickness of a first pipe string at locations axially along the first pipe string; and
    a processor in electronic communication with the logging tool, the processor programmed to:
        receive, from the logging tool, wall thickness measurements of a first pipe string at locations axially along the first pipe string at a first time;
        receive, from the logging tool, wall thickness measurements of the first pipe string at the locations at a second time;
        train a first well model based on an ML algorithm to predict a predicted amount of material loss in the future for the first pipe string at a selected location using the wall thickness measurements at the first and second times and well operating condition information related to the first pipe string;
determine an amount of actual material loss for the first pipe string at the locations based on the wall thickness measurements;
receive input from a user relating to user-defined color-coded categories based on the amount of actual material loss for the pipe string;
categorize the locations into the user-defined color-coded categories at the respective locations; and
generate a graphical user interface showing a visual representation of the amount of actual material loss for the first pipe string using the user-defined color-coded categories on a display.

9. The system of claim 8, wherein:
the processor is further programmed to:
associate each of the locations with a tubular section of the first pipe string; and
categorize each tubular section into a color-coded category based on the color-coded category of the location with largest amount of material loss for each tubular section; and
generating the graphical user interface showing the visual representation of the loss of material from the first pipe string comprises generating the graphical user interface showing the visual representation of the largest amount of material lost from each tubular section using the user-defined color-coded categories.

10. The system of claim 8, wherein the processor is further programmed to:
receive, from the logging tool, wall thickness measurements of the first pipe string at locations along the first pipe string at a third time;
predict a predicted amount of material loss at the locations at the third time with the first well model;
determine an amount of actual material loss for the first pipe string at the locations at the third time; and
compare the actual amount of actual material loss at the third time to the predicted amount of material loss at the third time to determine if the first well model is accurate.

11. The system of claim 10, wherein the processor is further programmed to retrain the first well model using the wall thickness measurements at the third time and additional well operating condition information generated between the second time and the third time.

12. The system of claim 8, wherein the processor is further programmed to:
train a second well model based on thickness measurements from and well operating condition information related to a second pipe string located in a second borehole in a same field as the first borehole; and
train a field model using the first well model and the second well model to predict how well operating conditions affect pipe strings located in boreholes in the field.

13. The system of claim 12, wherein the processor is further programmed to train the field model to predict at least one of rework or abandonment of any borehole in the field.

14. A non-transitory computer-readable medium comprising instructions which, when executed by a processor, enables the processor to perform a method for training a well model to predict material loss for a pipe string having a wall thickness and located within a borehole, the method comprising:
receiving wall thickness measurements of a first pipe string at locations axially along the first pipe string at a first time;
receiving wall thickness measurements of the first pipe string at the locations at a second time;
training a first well model based on an ML algorithm to predict a predicted amount of material loss in the future for the first pipe string at a selected location using the wall thickness measurements at the first and second times and well operating condition information related to the first pipe string;
determining an amount of actual material loss for the first pipe string at the locations based on the wall thickness measurements;
receiving input from a user relating to user-defined color-coded categories based on the amount of actual material loss for the pipe string;
categorizing the locations into the user-defined color-coded categories at the respective locations; and
generating a graphical user interface showing a visual representation of the amount of actual material loss for the first pipe string using the user-defined color-coded categories on a display.

15. The non-transitory computer-readable medium of claim 14, wherein the method further comprises determining when to plug and abandon the borehole based on the first well model.

16. The non-transitory computer-readable medium of claim 5, wherein the method further comprises:
associating each of the locations with a tubular section of the first pipe string;
categorizing each tubular section into one of the user-defined color-coded categories based on the color-coded category of the location with largest amount of material loss for each tubular section; and
generating the graphical user interface showing the visual representation of the loss of material from the first pipe string comprises generating the graphical user interface showing the visual representation of the largest amount of material lost from each tubular section using the user-defined color-coded categories.

17. The non-transitory computer-readable medium of claim 14, wherein the method further comprises:
receiving wall thickness measurements of the first pipe string at the locations at a third time;
predicting a predicted amount of material loss at the locations at the third time with the first well model;
determining an amount of actual material loss for the first pipe string at the locations at the third time; and
comparing the actual amount of actual material loss at the third time to the predicted amount of material loss at the third time to determine if the first well model is accurate.

18. The non-transitory computer-readable medium of claim 17, wherein the method further comprises retraining the first well model using the wall thickness measurements at the third time and additional well operating condition information generated between the second time and the third time.

19. The non-transitory computer-readable medium of claim 14, wherein the method further comprises:
training a second well model based on thickness measurements from and well operating condition information related to a second pipe string located in a second borehole in a same field as the first borehole; and
training a field model using the first well model and the second well model to predict how well operating conditions affect pipe strings located in boreholes in the field.

20. The non-transitory computer-readable medium of claim 19, wherein the method further comprises training the field model to predict at least one of rework or abandonment of any borehole in the field.

* * * * *

UNITED STATES PATENT AND TRADEMARK OFFICE
CERTIFICATE OF CORRECTION

| | |
|---|---|
| PATENT NO. | : 12,000,976 B2 |
| APPLICATION NO. | : 17/006110 |
| DATED | : June 4, 2024 |
| INVENTOR(S) | : Sebastian Kroczka, Welton Danniel Souza and Chafaa Badis |

It is certified that error appears in the above-identified patent and that said Letters Patent is hereby corrected as shown below:

In the Claims

In Column 14, Line 29, "claim 5" should be changed to "claim 15"

Signed and Sealed this
Sixteenth Day of July, 2024

Katherine Kelly Vidal
*Director of the United States Patent and Trademark Office*